(12) United States Patent
Hsu et al.

(10) Patent No.: US 12,468,202 B2
(45) Date of Patent: Nov. 11, 2025

(54) REFLECTIVE DISPLAY PANEL

(71) Applicant: HannStar Display Corporation, Taipei (TW)

(72) Inventors: Wei-Chih Hsu, Taichung (TW);
Ding-Wei Liu, Kaohsiung (TW);
Yen-Chung Chen, Taichung (TW);
Cheng-Yen Yeh, Taichung (TW);
Chen-Hao Su, Taichung (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 18/527,393

(22) Filed: Dec. 4, 2023

(65) Prior Publication Data

US 2024/0241414 A1    Jul. 18, 2024

(30) Foreign Application Priority Data

Jan. 17, 2023   (CN) .......................... 202310058414.9

(51) Int. Cl.
*G02F 1/1368* (2006.01)
*G02F 1/1362* (2006.01)

(52) U.S. Cl.
CPC ...... *G02F 1/1368* (2013.01); *G02F 1/136222* (2021.01)

(58) Field of Classification Search
None
See application file for complete search history.

(56) References Cited

U.S. PATENT DOCUMENTS

| | | | |
|---|---|---|---|
| 2006/0103786 A1* | 5/2006 | Koma | G02F 1/13394 349/107 |
| 2010/0225855 A1* | 9/2010 | Lu | G02F 1/133555 349/114 |
| 2017/0010503 A1 | 1/2017 | Song et al. | |
| 2018/0321548 A1* | 11/2018 | Li | G09G 3/3611 |
| 2020/0019029 A1* | 1/2020 | Park | G09G 3/3607 |
| 2021/0215980 A1* | 7/2021 | Shim | G02F 1/136286 |

FOREIGN PATENT DOCUMENTS

| | | |
|---|---|---|
| CN | 110412798 A | 11/2019 |
| CN | 110703475 A | 1/2020 |
| TW | 202102906 A | 1/2021 |

* cited by examiner

*Primary Examiner* — Richard H Kim
(74) *Attorney, Agent, or Firm* — CKC & Partners Co., LLC

(57) ABSTRACT

A reflective display panel includes a first substrate and a second substrate. A thin film transistor and a reflective layer are disposed on the first substrate. A color resist layer is disposed on the second substrate. The reflective display panel includes a color sub-pixel region and a white sub-pixel region adjacent to each other. The color sub-pixel region has the color resist layer, and the white sub-pixel region has no color resist layer. A buffer layer is disposed in the white sub-pixel region on the first substrate or the second substrate. A cell gap between the first substrate and the second substrate in the white sub-pixel region is smaller than a cell gap between the first substrate and the second substrate in the color sub-pixel region. In this way, reflectivity and chromaticity can be improved.

6 Claims, 5 Drawing Sheets

REFLECTIVE DISPLAY PANEL

RELATED APPLICATIONS

This application claims priority to China Application Serial Number 202310058414.9 filed Jan. 17, 2023, which is herein incorporated by reference.

BACKGROUND

Field of Invention

The present disclosure relates to a reflective display panel. More particularly, the present disclosure relates to a gap difference between two adjacent sub-pixel regions.

Description of Related Art

In a reflective display panel, a photoresist layer is set according to the color that a sub-pixel is intended to display. If white is to be displayed, no photoresist layer is set. Generally, the photoresist layer is set on a color filter substrate, and then a flat layer is formed on the photoresist layer. Although there is the flat layer, there still are discontinuities between different sub-pixels that will reduce the reflectivity of the sub-pixels. In some applications, a pixel includes a white sub-pixel and a red sub-pixel adjacent to each other. The cell gap of the red sub-pixel is smaller, which reduces the reflectivity of the red sub-pixel and also affects the performance of red chromaticity.

SUMMARY

Embodiments of the present disclosure provide a reflective display panel having multiple sub-pixel regions. The reflective display panel includes a first substrate, a second substrate, a thin film transistor disposed on the first substrate, a reflective layer disposed on the first substrate, a color resist layer disposed on the second substrate, and a buffer layer disposed on the first substrate or the second substrate. The sub-pixel regions include a color sub-pixel region and a white sub-pixel region, the color sub-pixel region has the color resist layer, the white sub-pixel region does not have the color resist layer, and the color sub-pixel region is adjacent to the white sub-pixel region. The buffer layer is located in the white sub-pixel region. There is a first cell gap between the first substrate and the second substrate in the white sub-pixel region. There is a second cell gap between the first substrate and the second substrate in the color sub-pixel region. The first cell gap is less than the second cell gap.

In some embodiments, the reflective display panel further includes a spacer disposed between the first substrate and the second substrate and is located in the white sub-pixel region.

In some embodiments, the buffer layer is disposed on the second substrate. The buffer layer includes organic material and is in contact with the spacer.

In some embodiments, the buffer layer is disposed on the first substrate. The buffer layer includes organic material and is disposed between the spacer and the buffer layer.

In some embodiments, the spacer is disposed on the second substrate.

In some embodiments, a difference between the first cell gap and the second cell gap is greater than 0 micron and less than 0.9 microns.

In some embodiments, the first cell gap is greater than or equal to 1.9 microns, and is less than or equal to 2.8 microns.

In some embodiments, the second cell gap is greater than or equal to 2.4 microns, and is less than or equal to 2.8 microns.

In some embodiments, the color resist layer is a red filter, a blue filter, a green filter, or a yellow filter.

In some embodiments, an area of the white sub-pixel region is greater than an area of the color sub-pixel region.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Figure 1:
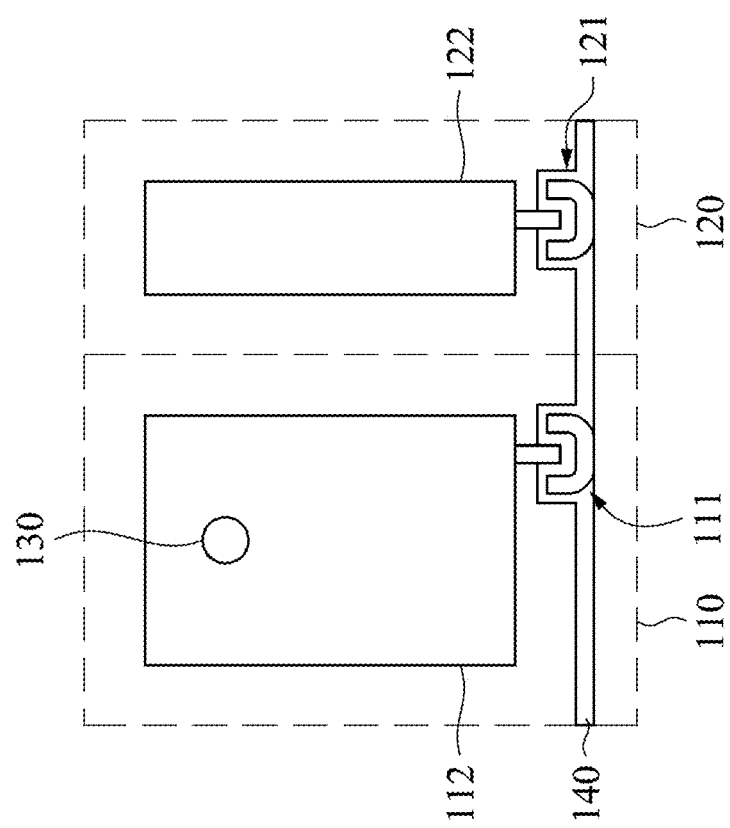
FIG. 1 is a top view of two sub-pixel regions in a reflective display panel according to one embodiment.

FIG. 1 is a top view of two sub-pixel regions in a reflective display panel according to one embodiment. Two adjacent sub-pixel regions 110 and 120 are illustrated. The sub-pixel region 110 is also referred to as a white sub-pixel region, and the sub-pixel region 120 is also referred to as a color sub-pixel region. The area of the white sub-pixel region 110 is greater than that of the color sub-pixel region 120. In this embodiment, the two sub-pixel regions 110 and 120 constitute a pixel, but in other embodiments, a pixel can be composed of more sub-pixel regions. The color sub-pixel region 120 is used to display red, yellow, blue, green, etc., but this disclosure is not limited to these colors. The white sub-pixel region 110 includes a thin film transistor 111 and a pixel electrode 112. The pixel electrode 112 is electrically connected to the drain of the thin film transistor 111. The color sub-pixel region 120 includes a thin film transistor 121 and a pixel electrode 122. The pixel electrode 122 is electrically connected to the drain of the thin film transistor 121. In addition, a gate line 140 is electrically connected to the gates of the thin film transistors 111 and 121. For simplicity, not all components within the sub-pixel regions 110 and 120 are shown in FIG. 1. For example, each sub-pixel region 110 and 120 can also include a data line, a common electrode, a reflective layers, etc.

Figure 2:
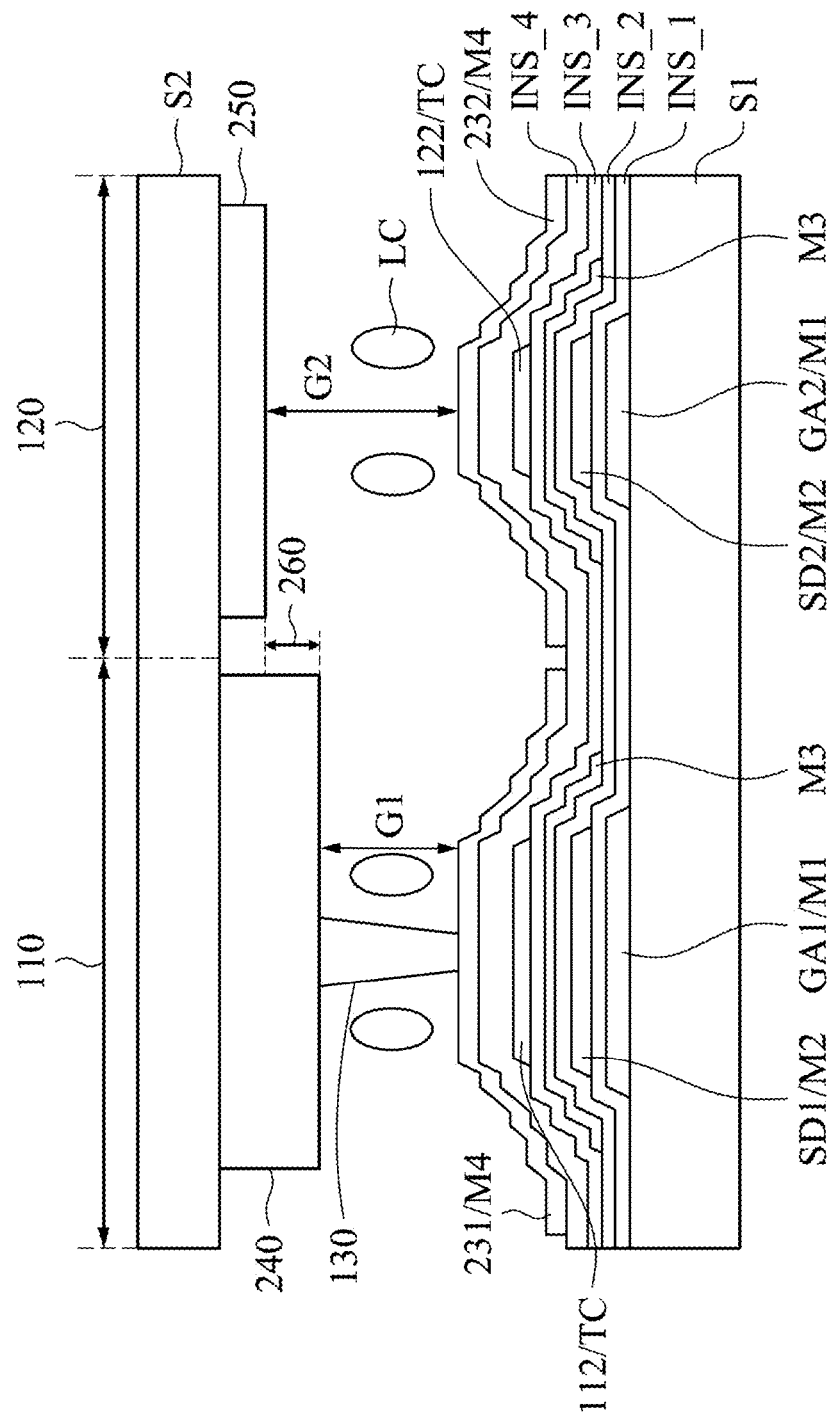
FIG. 2 is a cross-sectional view of the sub-pixel region 110 and the sub-pixel region 120 according to an embodiment.

FIG. 2 is a cross-sectional view of the sub-pixel region 110 and the sub-pixel region 120 according to an embodiment. Referring to FIG. 1 and FIG. 2, the reflective display panel includes a first substrate S1 and a second substrate S2 which are opposite to each other. The first substrate S1 is also referred to as an array substrate, and the second substrate S2 is also referred to as a color filter substrate. A first metal layer M1, a first insulating layer INS_1, a second metal layer M2, a second insulating layer INS_2, a third metal layer M3, a third insulating layer INS_3, a transparent conductive layer TC, a fourth insulating layer INS_4, and a fourth metal layer M4 are sequentially disposed on the first substrate S1. The first metal layer M1 includes a gate GA1 located in the first sub-pixel region 110 and a gate GA2 located in the second sub-pixel region 120. The second metal layer M2 includes a source or drain SD1 located in the first sub-pixel region 110, and a source or drain SD2 located in the second sub-pixel region 120. The third metal layer M3 is used to compensate for the capacitance of the pixel electrode. The transparent conductive layer TC includes the pixel electrode 112 in the first sub-pixel region 110 and the pixel electrode 122 in the second sub-pixel region 120. The fourth metal layer M4 includes a reflective layer 231 in the first sub-pixel region 110 and a reflective layer 232 in the second sub-pixel region 120. The reflective layer 231 is electrically connected to the pixel electrode 112 (via other structures), and the reflective layer 232 is electrically connected to the pixel electrode 122 (via other structures), but the reflective layer 231 and the reflective layer 232 are electrically insulated from each other.

Depending on the color to be displayed by the sub-pixel region, a buffer layer or a color resist layer can be disposed on the second substrate S2. Specifically, a buffer layer 240 is disposed in the white sub-pixel region 110, and a color resist layer 250 is disposed in the color sub-pixel region 120. The thickness of the buffer layer 240 is greater than the thickness of the color resist layer 250, which makes the cell gap G1 between the first substrate S1 and the second substrate S2 in the white sub-pixel region 110 smaller than the cell gap G2 between the first substrate S1 and the second substrate S2 in the color sub-pixel region 120. In other words, a gap difference 260 is formed between the white sub-pixel region 110 and the color sub-pixel region 120. A spacer 130 and a liquid crystal layer LC are also disposed between the first substrate S1 and the second substrate S2. The spacer 130 is disposed in the white sub-pixel region 110. In some embodiments, the buffer layer 240 includes organic material and is in contact with the spacer 130. In other embodiments, the spacer 130 is disposed in the color sub-pixel region 120. The spacer 130 can include any photoresist material. The spacer 130 is formed on the second substrate S2 in this embodiment, but it can also be formed on the first substrate S1 in other embodiments.

Figure 3A:
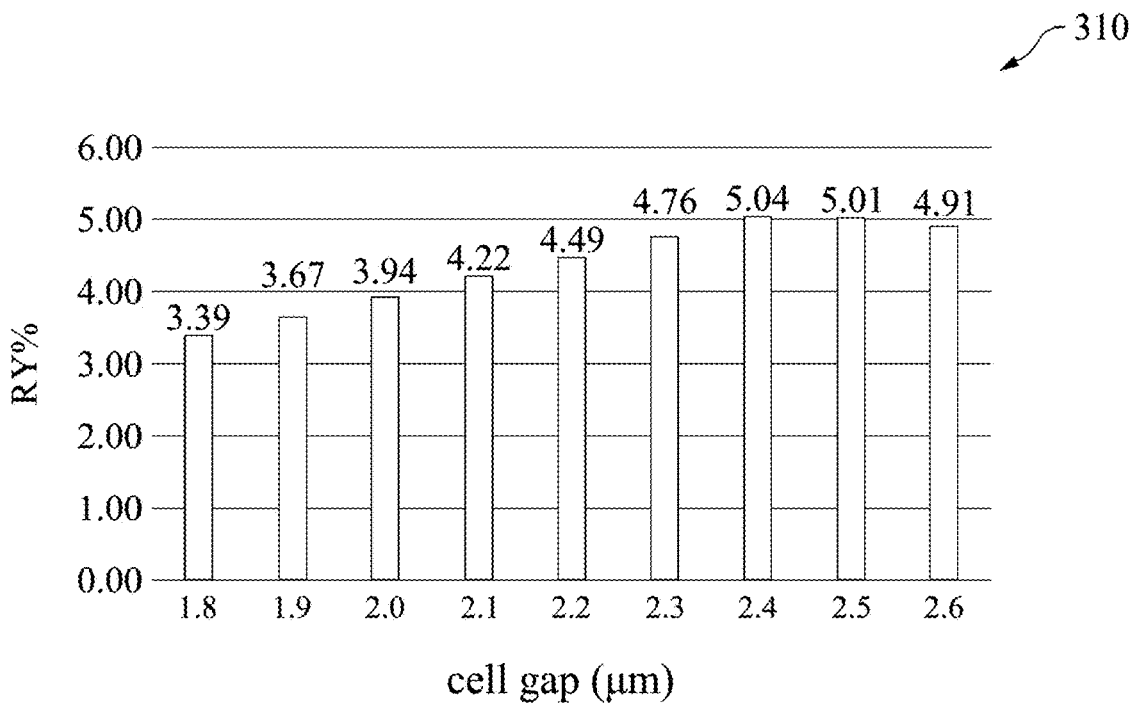
FIG. 3A is a bar chart illustrating the relationship between the cell gap and reflectivity RY % of a red sub-pixel according to an embodiment.

The reflective display panel displays images based on an external light source. Light rays enter from the side of the second substrate S2. A voltage is applied to the pixel electrode in each sub-pixel, which changes the orientation of the liquid crystal to determine the grayscale. The light is then reflected by the reflective layers 231 and 232 and emitted out from the second substrate S2. The aforementioned cell gaps G1 and G2 affect the optical path difference, which in turn affects the reflectivity and chromaticity. FIG. 3A is a bar chart illustrating the relationship between the cell gap and reflectivity RY % of the red sub-pixel according to an embodiment. Referring to FIG. 3A, the horizontal axis of a chart 310 is the cell gap of the sub-pixel region 120, and the vertical axis is the reflectivity RY % of the red sub-pixel. When the cell gap increases from 1.8 microns to 2.4 microns, the reflectivity RY % also increases, which enhances the brightness of the red color.

Figure 3B:
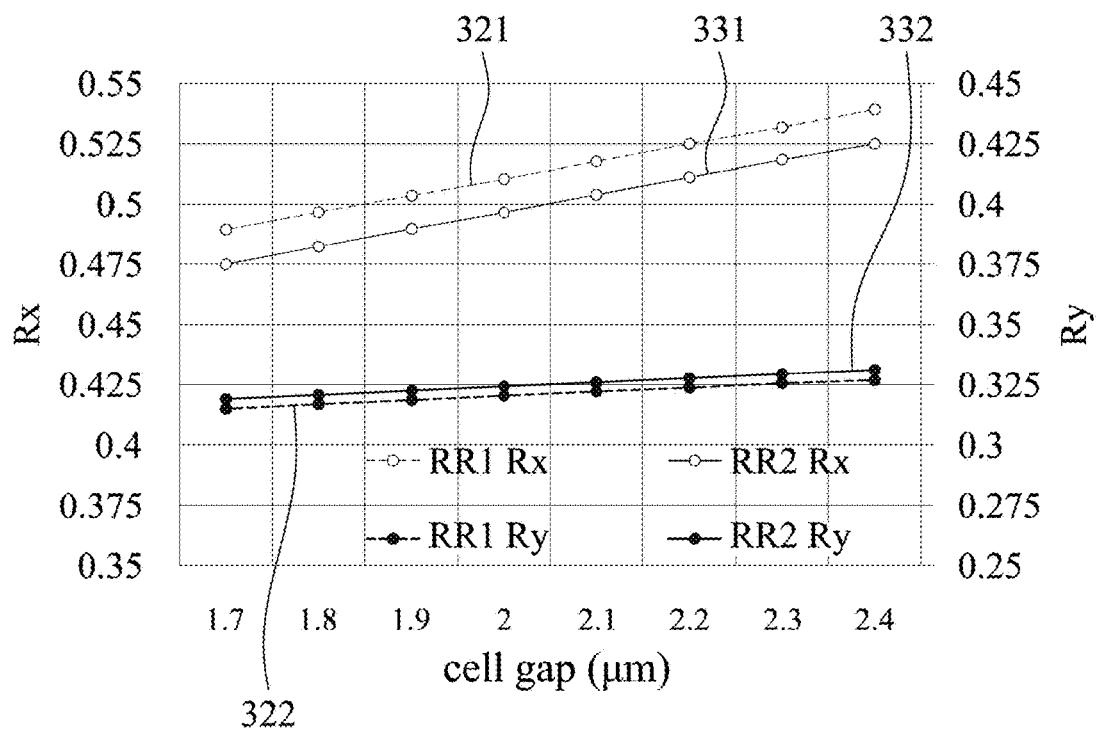
FIG. 3B is a diagram illustrating the relationship between the cell gap and color saturation of a red sub-pixel according to an embodiment.

FIG. 3B is a diagram illustrating the relationship between the cell gap and color saturation of the red sub-pixel according to an embodiment. The horizontal axis is the cell gap of the red sub-pixel, the left vertical axis is the x-component Rx of the color space, and the right vertical axis is the y-component Ry of the color space. A curve 321 represents the x-component of a first embodiment, marked as "RR1 Rx" in the figure; a curve 322 represents the y-component of the first embodiment, marked as "RR1 Ry" in the figure; a curve 331 represents the x-component of a second embodiment, marked as "RR2 Rx" in the figure; and a curve 332 represents the y-component of the second embodiment, marked as "RR2 Ry" in the figure. As can be seen from FIG. 3B, when the cell gap increases, both the x-component Rx and the y-component Ry increase in both embodiments, which can enhance the red color saturation (improving Rxy optical properties). Although FIGS. 3A and 3B use a red sub-pixel as an example, when other colors, such as yellow, green, blue, or any color are applied, the aforementioned reflectivity and color saturation still increase with the cell gap.

Figure 4A:
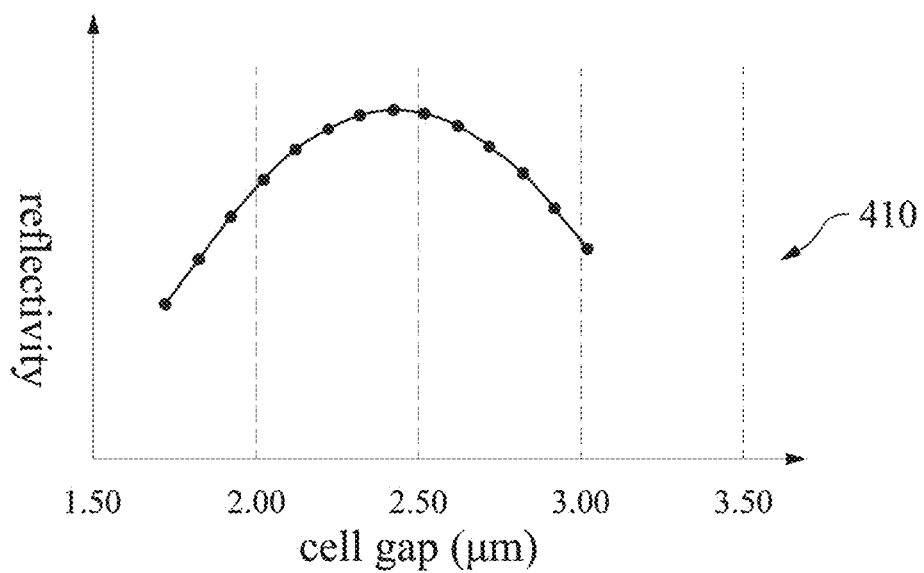
FIG. 4A is a diagram illustrating the relationship between the cell gap and reflectivity of a white sub-pixel region according to an embodiment.
Figure 4B:
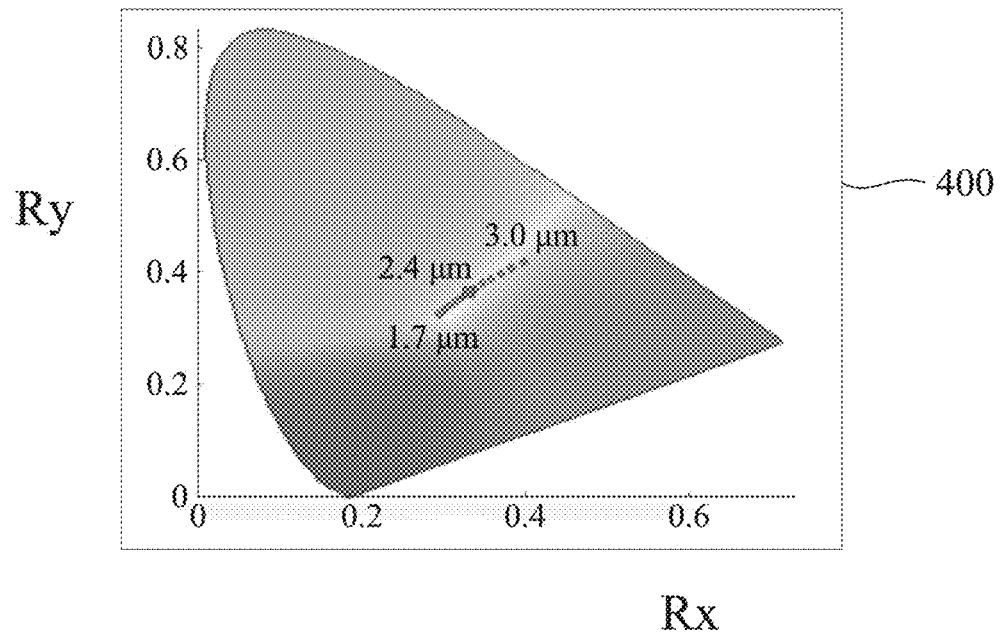
FIG. 4B is a diagram illustrating the relationship between the cell gap and chromaticity of the white sub-pixel region according to an embodiment.

FIG. 4A is a diagram illustrating the relationship between the cell gap and reflectivity of a white sub-pixel region according to an embodiment. In a chart 410, the horizontal axis is the cell gap of the white sub-pixel (e.g. the cell gap G1 in FIG. 2), and the vertical axis is the reflectivity of the white sub-pixel. When the cell gap G1 increases from about 1.7 microns to about 2.4 microns, the reflectivity of the white sub-pixel increases, and then gradually decreases. Although an increase in cell gap G1 can enhance reflectivity, it also causes a color shift towards yellow. FIG. 4B is a diagram illustrating the relationship between the cell gap and chromaticity of the white sub-pixel region according to an embodiment. Refer to FIG. 4B, a chromaticity diagram 400 has a horizontal axis for the x-component (Rx) of the CIE 1931 color space, and a vertical axis for the y-component (Ry). FIG. 4 shows the coordinates when the cell gap is 1.7 microns, 2.4 microns, and 3 microns, respectively. In the white sub-pixel region, although an increase in cell gap enhances reflectivity, it gradually shifts to the right in the chromaticity diagram 400, which means a shift towards yellow.

Because the area of the color sub-pixel region 120 is smaller, its reflectivity will be smaller. Therefore, the reflectivity can be enhanced by increasing the cell gap G2. The cell gap G1 can be determined according to the specifications. Although an increase in cell gap G1 can enhance reflectivity, it also causes a color shift towards yellow. If the yellowing color is acceptable, a larger cell gap G1 can be set; otherwise, a smaller cell gap G1 is adopted. In some embodiments, the aforementioned cell gap G1 is greater than or equal to 1.9 microns and less than or equal to 2.8 microns; the aforementioned cell gap G2 is greater than or equal to 2.4 microns and less than or equal to 2.8 microns. In some embodiments, the difference (i.e. the gap difference 260) between the cell gap G1 and the cell gap G2 is greater than 0 micron and less than 0.9 microns. In some embodiments, the gap difference 260 is greater than 0 micron and less than 0.5 microns. In some embodiments, the cell gap G1 is set to be 1.9 microns while the cell gap G2 is set to be 2.4 microns, and this configuration can maintain a white base color and enhance the red reflectivity at the same time. In this embodiment, the reflective display panel is implemented as an electronic tag, and the color resist layer 250 is a red filter. However, the disclosure is not limited to this; in other embodiments, the color resist layer 250 could also serve as a blue filter, a green filter, or a yellow filter.

Figure 5:
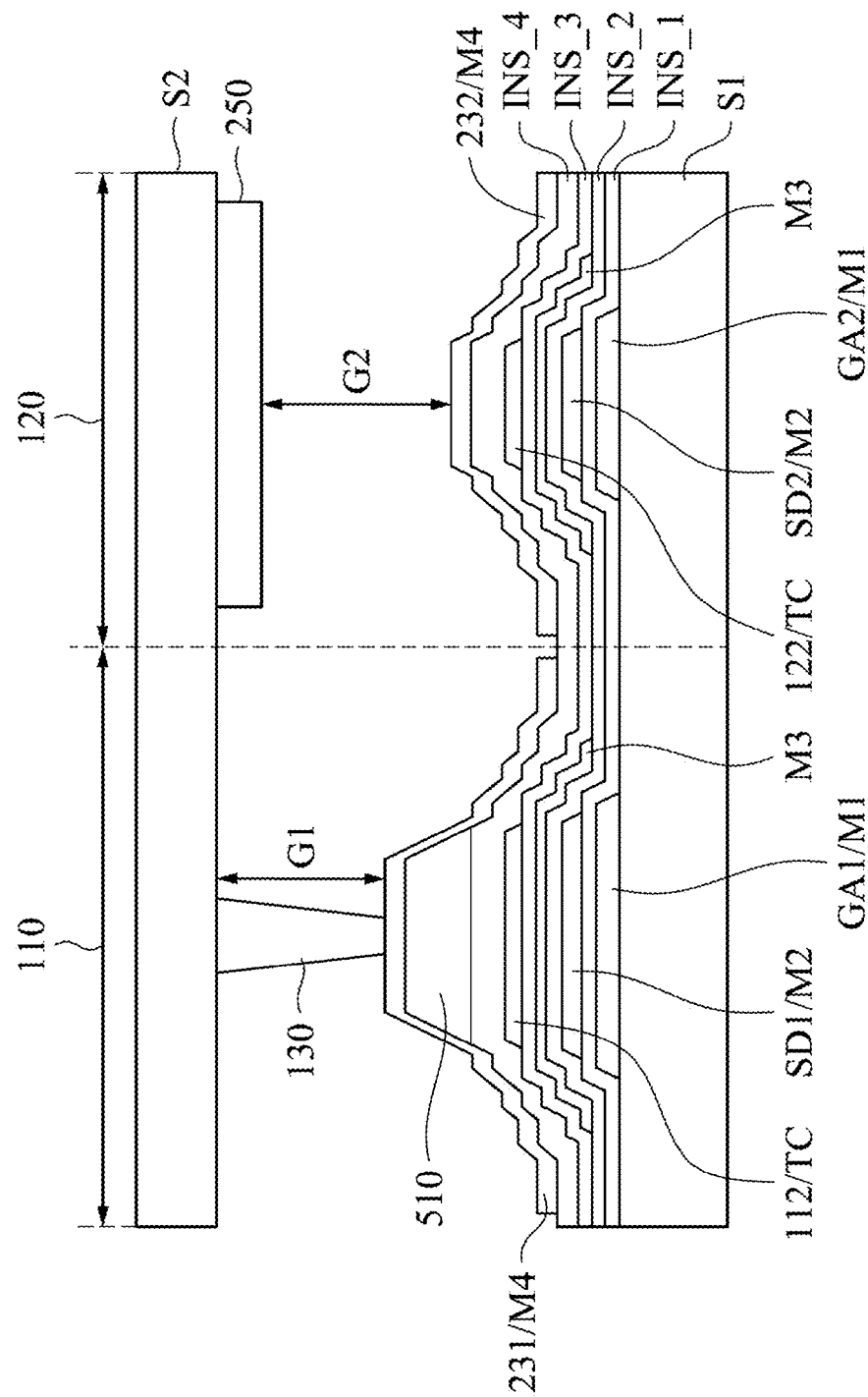
FIG. 5 is a cross-sectional view of a reflective display panel according to an embodiment.

In the above embodiments, the buffer layer is disposed on the second substrate S2, but in other embodiments, the buffer layer can also be disposed on the first substrate S1. For example, FIG. 5 shows a cross-sectional view of a reflective display panel according to an embodiment. In the embodiment of FIG. 5, a buffer layer 510 is disposed on the first substrate S1 and in the white sub-pixel region 110. The buffer layer 510 is disposed on the fourth insulation layer INS_4. The reflective layer 231 and the spacer 130 are disposed on the buffer layer 510. Additionally, there is no buffer layer 510 in the color sub-pixel region 120, and the thickness of the buffer layer 510 is greater than that of the color resist layer 250. Therefore, the cell gap G1 of the white sub-pixel region 110 is smaller than the cell gap G2 of the color sub-pixel region 120. In some embodiments, the cell gap G1 is greater than or equal to 1.9 microns and less than or equal to 2.8 microns; the cell gap G2 is greater than or equal to 2.4 microns and less than or equal to 2.8 microns. The gap difference between cell gap G1 and cell gap G2 is greater than 0 and less than 0.9 microns. In this embodiment, the buffer layer 510 includes organic material, and the reflective layer 231 is disposed between the spacer 130 and the buffer layer 510.

In the above embodiments, since an additional buffer layer is disposed in the white sub-pixel region, the cell gap of the color sub-pixel region is greater than the cell gap of the white sub-pixel region. This has improved the issue of low reflectivity and color saturation.

The material of the first substrate S1 and the second substrate S2 may include glass, polymer, polyethylene terephthalate (PET), polycarbonate (PC), polyether sulfone (PES), triacetyl cellulose (TAC), PMMA, polyethylene, COP, polyimide (PI), compound material of PC and PMMA, etc. which is not limited in the disclosure. The material of the pixel electrodes 112 and 122 may include indium tin oxide (ITO), indium zinc oxide (IZO), antimony tin oxide (ATO), fluorine tin oxide (FTO), etc. The above-mentioned insulating layer can be silicon nitride, silicon dioxide, silicon oxynitride, or any other suitable insulating layer. One layer of the insulating layer shown in the diagram can include two or more insulating layers made of different materials stacked on top of each other. The aforementioned metal layer may include single metal layers such as aluminum, copper, titanium, tungsten, or composite metal layers such as molybdenum/aluminum/molybdenum, titanium/aluminum titanium, titanium/copper/titanium, titanium/copper, etc. The present disclosure is not limited to these examples.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A reflective display panel having a plurality of sub-pixel regions, wherein the reflective display panel comprises:
    a first substrate;
    a second substrate;
    a thin film transistor disposed on the first substrate;
    a first reflective layer and a second reflective layer disposed on the first substrate;
    a color resist layer disposed on the second substrate, wherein the sub-pixel regions comprise a color sub-pixel region and a white sub-pixel region, the color sub-pixel region has the color resist layer, the white sub-pixel region does not have the color resist layer, and the color sub-pixel region is adjacent to the white sub-pixel region, and the entire planar area of the white sub-pixel region is greater than the entire planar area of the color sub-pixel region, wherein the first reflective layer is located in the color sub-pixel region, and the second reflective layer is located in the white sub-pixel region; and
    a buffer layer disposed on the first substrate or the second substrate, wherein the buffer layer is located in the white sub-pixel region, there is a first cell gap between the first substrate and the second substrate in the white sub-pixel region, there is a second cell gap between the first substrate and the second substrate in the color sub-pixel region, and the first cell gap is less than the second cell gap, wherein a difference between the first cell gap and the second cell gap is greater than 0 micron and less than 0.9 microns, wherein the first cell gap is greater than or equal to 1.9 microns, and is less than or equal to 2.8 microns, wherein the second cell gap is greater than or equal to 2.4 microns, and is less than or equal to 2.8 microns.

2. The reflective display panel of claim 1, further comprising:
    a spacer disposed between the first substrate and the second substrate and is located in the white sub-pixel region.

3. The reflective display panel of claim 2, wherein the buffer layer is disposed on the second substrate, the buffer layer comprises organic material, and the buffer layer is in contact with the spacer.

4. The reflective display panel of claim 2, wherein the buffer layer is disposed on the first substrate, the buffer layer comprises organic material, and the first reflective layer and the second reflective layer are disposed between the spacer and the buffer layer.

5. The reflective display panel of claim 4, wherein the spacer is disposed on the second substrate.

6. The reflective display panel of claim 1, wherein the color resist layer is a red filter, a blue filter, a green filter, or a yellow filter.

* * * * *